June 22, 1937.  L. BERTELE  2,084,309
PHOTOGRAPHIC LENS SYSTEM
Filed Jan. 6, 1936
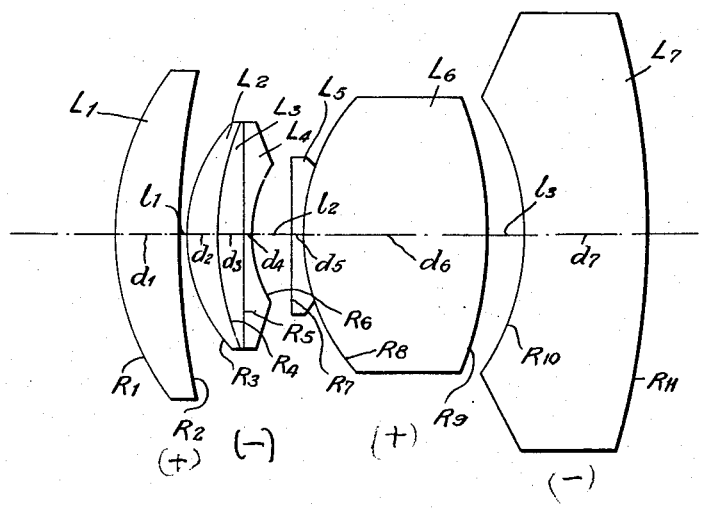
Inventor:
Ludwig Bertele
by B. Singer
Attorney Patented June 22, 1937

2,084,309

UNITED STATES PATENT OFFICE 2,084,309

PHOTOGRAPHIC LENS SYSTEM

Ludwig Bertele, Dresden, Germany, assignor to Zeiss Ikon Aktiengesellschaft, Dresden, Germany Application January 6, 1936, Serial No. 57,643
In Germany June 16, 1934

3 Claims. (Cl. 88—57)

This invention relates to a photographic lens system which has the advantage of showing a large image angle for all pencils of light rays at a great aperture and at maximum comatic correction.

Lens systems are known which comprise four lens units separated from each other by air spaces. In these prior lens systems the first unit was a collective unit, the second unit a composite cemented concavo-convex unit with the convex side directed towards the object. The third unit was a collective unit with the cementing surface convex towards the object, and the fourth unit was a concavo-convex unit with the convex side towards the image to be produced, the air space between the third and fourth units having the concavo-convex meniscus shape with the convex side directed towards the image.

Lens systems are, furthermore, known which comprise four units separated by air spaces and wherein also the first unit was a collective unit, the second a cemented concavo-convex meniscus unit with the convex side directed towards the object, the third unit a collective unit and the fourth unit a concavo-convex meniscus unit with a convex cementing surface directed towards the object. In this system, the air space between the third and fourth units also had the shape of a collective concavo-convex meniscus with the convex side directed towards the image.

The present invention relates specifically to a photographic lens system comprising four units separated from each other by air spaces. The first unit again is a collective unit, the second a cemented concavo-convex meniscus unit with the convex side towards the object, the third unit is a collective unit with a cementing surface convex towards the object, and the fourth unit is a concavo-convex meniscus lens with the convex side towards the image. The air space between the third and fourth units also is a collective meniscus with the convex side directed towards the image.

The accompanying drawing illustrates diagrammatically and by way of example the outline of the axial cross section of a lens system of the present invention.

The first or front unit of the photographic lens system of the invention—so named because it faces the object to be photographed—consists of a collective lens $L_1$ ($d_1$) having the convex face $R_1$ and the concave face $R_2$ which latter face is directed rearwardly. The second lens unit is spaced from the front unit by the air-space $l_1$ and comprises at least one positive lens and one negative lens all cemented together to form a meniscus which is curved toward the front unit, the negative lens facing the second air space $l_2$. In the present instance two positive lenses are provided, namely a convexo-concave lens $L_2$ ($d_2$) and a convexo-plane lens $L_3$ ($d_3$) which latter is made of a lower refractive kind of glass than the negative or plano-concave lens $L_4$ ($d_4$) as indicated by the numerical statement $nd=1,4645$ in the example at the end of the specification. The concave face $R_6$ of the lens $L_4$ ($d_4$) has a smaller radius of curvature than the convex face $R_3$ of the lens $L_2$ ($d_2$) or the convex face $R_4$ respectively. The third lens unit consists of two lenses $L_5$ ($d_5$) and $L_6$ ($d_6$) cemented together. The lens $L_5$ ($d_5$) which faces the air-space $l_2$ is a negative lens and has a lower refractive index, namely $nd=1,4645$, than the positive lens $L_6$ ($d_6$) to which it is cemented, as is indicated in the example at the end of the specification. The fourth or rear lens unit is spaced from the outer convex face $R_9$ of the third lens unit by the air-space $l_3$ and consists of a concavo-convex lens $L_7$ ($d_7$). The outer convex face $R_{11}$ of this lens $L_7$ ($d_7$) which is directed toward the plane in which the image of the photographed object will appear has a larger radius of curvature than the concave face $R_{10}$ which is directed toward the third lens unit. It is apparent that due to the shape and arrangement of the third and fourth lens units the third air space $l_3$ has the form of a collective meniscus curved toward the rear of the lens system.

The advantages attained by this new assembly of units are important.

In the first described lens system, the air space between the third and the fourth units has a slight dispersing effect. Owing to this shape of the air space between the third and fourth units, it is impossible to eliminate spheric aberration in a manner which would be of advantage for the correction of comatic defects. This correction, however, or this elimination of spheric aberration becomes complete when the air space has the shape of a meniscus of collective properties, and is convex towards the image.

The new lens system also is advantageously distinguished from the second described known systems of four units inasmuch as the cementing surface convex towards the object is located in the third unit, and hence in front of the collective air lens between the third and fourth unit instead of being in the fourth unit to the rear of the air space.

In practical tests it was shown that a cementing surface located to the rear of the collective air lens will eliminate comatic errors upon suitable selection of the radii of the lenses and suitable gradation of the indices of refraction. This elimination, however, applies solely to pencil rays of a certain angle, but not to rays of all inclinations.

A practical embodiment of the invention has the following numerical optical data:

Example $R_1 = + 53.46$
$\quad d_1 = 12.89\ L_1\ nd = 1.6716\ v = 47.2$
$R_2 = +157.23$
$\quad l_1 = 1.57$
$R_3 = + 33.33$
$\quad d_2 = 5.47\ L_2\ nd = 1.6716\ v = 47.2$
$R_4 = + 62.89$
$\quad d_3 = 5.22\ L_3\ nd = 1.4645\ v = 65.7$
$R_5 = \infty$
$\quad d_4 = 1.89\ L_4\ nd = 1.6890\ v = 31.0$
$R_6 = + 25.94$
$\quad l_2 = 7.55$
$R_7 = +417.60$
$\quad d_5 = 1.89\ L_5\ nd = 1.4645\ v = 65.7$
$R_8 = + 40.88$
$\quad d_6 = 37.74\ L_6\ nd = 1.6716\ v = 47.2$
$R_9 = - 78.62$
$\quad l_3 = 6.29$
$R_{10} = - 47.17$
$\quad d_7 = 25.16\ L_7\ nd = 1.5333\ v = 48.9$
$R_{11} = -168.02$

I claim:

1. A photographic lens system consisting of four lens units separated from each other by airspaces, the front unit being a collective lens, the second unit next to said front unit being made up of at least one positive lens and one negative lens cemented together to form a meniscus curved toward the front unit, at least one of the positive lenses having a lower refractive index than the negative lens which faces the second air-space, the concave outer face of said meniscus having a smaller radius of curvature than the convex outer face of the same, the third lens unit comprising two lenses cemented together, the one facing the second air-space being a negative lens and having a lower refractive index than the lens to which it is cemented and which is a positive lens, the rear lens unit being a concavo-convex lens the concave face of which facing the third air-space and having a smaller radius of curvature than the outer convex face, said third air space between the third unit and the rear unit having the shape of a collective meniscus curved toward the rear.

2. A photographic lens system consisting of four lens units separated from each other by airspaces, the front unit being a collective lens, the second unit next to said front unit being made up of a convexo-concave-lens, a convexo-plane lens and a plano-concave lens all cemented together in the order named and forming a meniscus curved toward said front unit, said convexo-plane lens having a lower refractive index than said plano-concave lens which faces the second air space, the concave outer face of said meniscus having a smaller radius of curvature than the convex outer face of the same, the third lens unit comprising two lenses cemented together, the one facing the second air-space being a negative lens and having a lower refractive index than the lens to which it is cemented and which is a positive lens, the rear lens unit being a concavo-convex lens the concave face of which facing the third air-space and having a smaller radius of curvature than the outer convex face, said third air space between the third unit and the rear unit having the shape of a collective meniscus curved toward the rear.

3. A photographic lens system consisting of four lens units separated from each other by airspaces, the front unit being a collective lens, the second unit next to said front unit being made up of a convexo-concave-lens, a convex lens and a concave lens all cemented together in the order named and forming a meniscus curved toward said front unit, said convex lens having a lower refractive index than said concave lens which faces the second air space, the concave outer face of said meniscus having a smaller radius of curvature than the convex outer face of the same, the third lens unit comprising two lenses cemented together, the one facing the second air-space being a negative lens and having a lower refractive index than the lens to which it is cemented and which is a positive lens, the rear lens unit being a concavo-convex lens the concave face of which facing the third air-space and having a smaller radius of curvature than the outer convex face, said third air-space between the third unit and the rear unit having the shape of a collective meniscus curved toward the rear.

LUDWIG BERTELE.